US009960960B2

(12) United States Patent
Chen et al.

(10) Patent No.: US 9,960,960 B2
(45) Date of Patent: May 1, 2018

(54) REMOTE MANAGEMENT SYSTEMS AND APPARATUSES FOR CWMP AND METHODS FOR IMPROVING PERFORMANCE OF REMOTE MANAGEMENT THEREOF

(71) Applicant: Industrial Technology Research Institute, Hsinchu (TW)

(72) Inventors: Chang-Shien Chen, Tainan (TW); Chi-Chun Chen, Hsinchu (TW); Kuen-Min Lee, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 322 days.

(21) Appl. No.: 14/152,962

(22) Filed: Jan. 10, 2014

(65) Prior Publication Data
US 2014/0321291 A1    Oct. 30, 2014

(30) Foreign Application Priority Data

Apr. 29, 2013    (TW) .............................. 102115200 A (51) Int. Cl.
 *H04L 12/24*    (2006.01)
(52) U.S. Cl.
 CPC ...... *H04L 41/0803* (2013.01); *H04L 41/0206* (2013.01); *H04L 41/0889* (2013.01)
(58) Field of Classification Search
 CPC ..... H04L 67/32; H04L 67/322; H04L 67/325; H04L 41/009; H04L 41/5009
 See application file for complete search history.

(56) References Cited

U.S. PATENT DOCUMENTS

| 7,991,861 | B2 | 8/2011 | Wu | |
| 2005/0286435 | A1* | 12/2005 | Ogawa | ............... H04L 41/0654 370/252 |
| 2009/0024725 | A1 | 1/2009 | Bernard et al. | |
| 2009/0292794 | A1* | 11/2009 | Ding | ................ H04L 12/2834 709/221 |
| 2010/0005161 | A1 | 1/2010 | Pollakowski et al. | |
| 2011/0145410 | A1* | 6/2011 | Caldwell | ............... G06F 9/5027 709/226 |

(Continued)

FOREIGN PATENT DOCUMENTS

| EP | 1990952 | 11/2008 |
| TW | 201123765 | 7/2011 |
| TW | 201220762 | 5/2012 |

OTHER PUBLICATIONS

Taiwan Patent Office, Office Action, Patent Application Serial No. 102115200, dated Feb. 17, 2015, Taiwan.

(Continued)

*Primary Examiner* — Andrew Chriss
*Assistant Examiner* — Voster Preval (57) ABSTRACT

A remote management system for Customer premises equipment WAN Management Protocol (CWMP) is provided. The remote management system includes at least one CPE (Customer Premises Equipment) and one server coupled to the CPE via a network. The CPE transmits a request to the server via the network. The server processes the request from the CPE according to a processing order, wherein the server provides a table which contains forecasted processing times for commands of a plurality of data models compatible with the CWMP. Upon receiving the request, the server generates a command configuration document according to the request, forecasts and obtains a first processing time corresponding to the command configuration document, and then dynamically adjusts and arranges the processing order for processing the request in the server according to the first processing time and a maximum waiting time corresponding to the request.

9 Claims, 9 Drawing Sheets

(56) References Cited

U.S. PATENT DOCUMENTS

| | | | |
|---|---|---|---|
| 2012/0155627 A1 | 6/2012 | Nair et al. | |
| 2012/0191841 A1* | 7/2012 | Swamidas | G06Q 30/02 709/224 |
| 2012/0216238 A1 | 8/2012 | Cristallo et al. | |
| 2014/0173117 A1* | 6/2014 | Takatsu | H04L 67/1002 709/226 |
| 2014/0241381 A1* | 8/2014 | Hamamatsu | H04L 7/0033 370/508 |

OTHER PUBLICATIONS

Lin Biying et al., "Jetty Improves the Performance of Network Management System Based on TR069 Protocol," Intelligent Computing and Intelligent Systems (ICIS), 2010 IEEE International Conference on, Oct. 2010, pp. 799-801, vol. 3, IEEE, US.

Tiago Cruz et al., "CWMP Extensions for Enhanced Management of Domestic Network Services," 35$^{th}$ Annual IEEE Conference on Local Computer Networks, Oct. 2010, pp. 180-183, IEEE, US.

Kenji Hori et al., "Customer Equipment Configuration Manager for Managed Network Service Providers," Integrated Network Management, 2007. IM '07. 10th IFIP/IEEE International Symposium on, May 2007, pp. 516-526, IEEE, US.

Enck, W. et al., "Configuration Management at Massive Scale: System Design and Experience," IEEE Journal on Selected Areas in Communications, Apr. 2009, vol. 27, No. 3, pp. 323-335, IEEE, US.

Houda Rachidi et al, "A Framework for Self-Configuring Devices Using TR-069," Multimedia Computing and Systems (ICMCS), 2011 International Conference on, Apr. 2011, pp. 1-6, IEEE, US.

* cited by examiner

| DATA MODEL | Configuration Command | Forecast Processing Time (second) |
| --- | --- | --- |
| TR-098 | Check | 0.2 |
|  | Read | 0.2 |
|  | Variable | m |
|  | Write | 0.4 |
|  | ..... | ..... |
| TR-069 | ..... | ..... |
| TR-104 | ..... | ..... |
| TR-106 | ..... | ..... |
| TR-157 | ..... | ..... |
| ..... | ..... | ..... |

REMOTE MANAGEMENT SYSTEMS AND APPARATUSES FOR CWMP AND METHODS FOR IMPROVING PERFORMANCE OF REMOTE MANAGEMENT THEREOF

CROSS REFERENCE TO RELATED APPLICATIONS

This Application claims priority of Taiwan Patent Application No. 102115200, filed on Apr. 29, 2013, the entirety of which is incorporated by reference herein.

TECHNICAL FIELD

The technical field relates generally to remote management systems and methods thereof, and more particularly to remote management systems and methods for improving performance of remote management thereof capable of supporting Customer Premises Equipment WAN Management Protocol (CWMP).

BACKGROUND

Recently, with the development of the Internet and the growing popularity of broadband network, the network services currently available on the Internet are growing. Thus, Telecom and Netcom service providers need to build relevant equipment to access information in order to provide related services to customers. However, operations such as installation, configuration, updating, debugging, and testing often lead to high human resource costs. Therefore, more and more telecommunications and network communications service providers choose to engage in related equipment control and management by means of remote network management, thereby reducing labor costs.

Customer Premises Equipment WAN Management Protocol (hereinafter referred to as CWMP) is one of the remote management standards most commonly used by service providers. It allows service providers to remote configure users' routers or home gateways, which not only spares users from actively seeking customer service support, but also greatly reduces maintenance costs on the part of service providers. In addition, the CWMP also provides a new way to deploy functions, so that users do not need to reinstall software or upgrade to new hardware.

CWMP is made up of Customer Premises Equipment (hereinafter referred to as CPE) and Auto-Configuration Server (hereinafter referred to as ACS). Simple Object Access Protocol (SOAP) is used to engage in information transmission through HTTP. Service providers may use a shared management platform to engage in remote centralized management, complete vast and complex automatic setting, and manage all CPEs under control of the ACS through the ACS via the Internet.

However, CWMP basically has traditional server-client management framework. That is, several CPEs are managed by one ACS. Thus, the management efficiency mainly depends on this management framework, the maximum number of connections of the ACS and CPE waiting time. Supposing the total CPE connections has exceeded the maximum number of connections of the ACS, requesting CPE must wait until a CPE finishes its processing to get connected. Once the time that the requesting CPE has spent to connect to the ACS has exceeded the maximum response time, the connection will fail.

On the other hand, the network topology framework and processing order are not specified in CWMP. When any CPE needs service, it has to communication with the ACS to establish a connect link and exchange packets therebetween in order to manage tasks in single sequence of a first-in-first-out manner. In this manner, the processing order will not be changed regardless of the length of processing time or the length of connection occupied. This will limit the ACS management capabilities and is likely to lengthen the waiting time of the entire CPE, resulting in poor management performance. Additionally, due to the limited processing connections for the ACS, the performance of the total number of CPE connection requests that can be processed by the ACS within the unit time may be reduced.

It is therefore a desire to provide methods and systems for improving CWMP management performance.

SUMMARY

Remote management system for Customer premises equipment WAN Management Protocol (CWMP) and related methods for improving performance of remote management and remote-performance-management apparatuses are provided.

An exemplary embodiment of a remote management system for CWMP comprises at least one CPE (Customer Premises Equipment) and one server coupled to the CPE via a network. The CPE transmits a request to the server via the network. The server processes the request from the CPE according to a processing order, wherein the server provides a table which contains forecasted processing times for commands of a plurality of data models compatible with the CWMP. Upon receiving the request, the server generates a command configuration document according to the request, forecasts and obtains a first processing time corresponding to the command configuration document, and then dynamically adjusts and arranges the processing order for processing the request in the server according to the first processing time and a maximum waiting time corresponding to the request.

In one exemplary embodiment, a method for improving performance of remote management for use in a server is provided, wherein the server remotely manages at least one customer premises equipment (CPE) and the server and the CPE are both supporting Customer premises equipment WAN Management Protocol (CWMP). The method comprises the steps of providing a table, wherein the table comprises a forecasted processing time for each responsive CWMP command of a plurality of predetermined data models which are CWMP-supported; and receiving a request from the at least one CPE and generating a command configuration document according to the request; forecasting and obtaining a first processing time corresponding to the command configuration document via the table; and determining a processing order in the server for the request according to the first processing time and a maximum waiting time (MWT) corresponding to the request. The processing order in the server for the request is dynamically adjusted according to the first processing time and the maximum waiting time (MWT) corresponding to the request.

Another exemplary embodiment of a remote-performance-management apparatus is configured between a server and at least one customer premises equipment (CPE), wherein the server and the CPE are both supporting Customer premises equipment WAN Management Protocol (CWMP). The remote-performance-management apparatus comprises at least a table and a processing module. The table comprises a forecasted processing time for each responsive CWMP command of a plurality of predetermined data models which are CWMP-supported. The processing module is arranged for generating a command configuration document according to a request upon receiving the request from the at least one CPE, forecasting and obtaining a first processing time corresponding to the command configuration document via the table, generating a ranking value according to the first processing time and a maximum waiting time (MWT) corresponding to the request, and transmitting the ranking value to the server, such that the server dynamically adjusts a processing order in the server for the request according to the ranking value.

BRIEF DESCRIPTION OF THE DRAWINGS

The disclosure will become more fully understood by referring to the following detailed description with reference to the accompanying drawings, wherein.

DETAILED DESCRIPTION

This description is made for the purpose of illustrating the general principles of the application and exemplary embodiments will be described in detail with reference to accompanying drawings so as to be easily realized by a person having ordinary knowledge in the art. The inventive concept may be embodied in various forms without being limited to the exemplary embodiments set forth herein.

Figure 1:
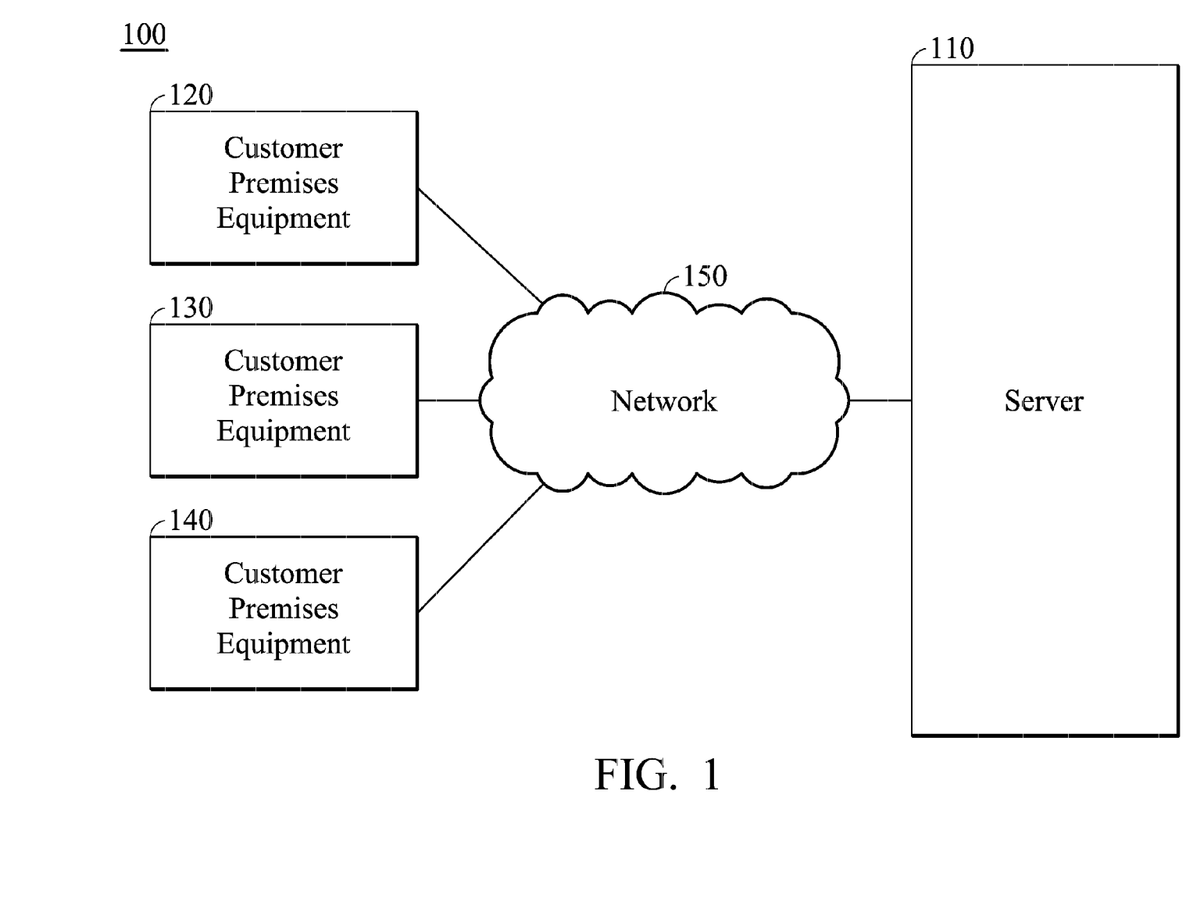
FIG. 1 is a schematic diagram illustrating an exemplary embodiment of a remote management system for supporting CWMP of the disclosure.

FIG. 1 is a schematic diagram illustrating an exemplary embodiment of a remote management system for supporting CWMP of the disclosure. As shown in FIG. 1, the remote management system 100 comprises at least one server 110 and multiple customer premises equipments (CPEs) 120, 130 and 140. The CPEs 120, 130 and 140 may directly be coupled to the server 110 via a network 150 (such as a broadband network or Internet) or may indirectly be coupled to the server 110 via a gateway device (not shown) and other communication networks, such as WPAN, WLAN, WAN and so on, such that the server 110 can manage all of the CPEs 120, 130 and 140 via the network 150. In this embodiment, CWMP may comprise CWMP and related protocols defined by the Broadband association, such as TR-069 standard protocol, and each of the CPEs 120, 130 and 140 is an CPE compatible with the CPE defined in CWMP which is defined by the Broadband association while the server 110 is a server compatible with the ACS defined in CWMP which is defined by the Broadband association. The CWMP is designated to manage CPEs, wherein a remote manager can perform, using the remote procedure call (RPC) methods and data models defined by the CWMP standard, various managements on the CPEs 120, 130 and 140 via the server 110, such as installation, configuration and upgrade software, hardware or firmware of one CPE or performing system problem diagnosis procedure. For example, the CPEs 120, 130 and 140 can be various types of Internet-connectable mobile and handheld devices or computer systems, such as mobile phones, table TV set-top boxes, PDAs (Personal Digital Assistants), navigation systems, laptop computers, MP3 players, remote-controllable devices or the likes. However, it is to be understood that the disclosure is not limited thereto. In one embodiment, the CPE is an Internet-connectable device with at least one processing unit, e.g. a mobile phone, but it is not limited thereto.

Subject to management of the server 110, the server 110 can proceed with the relevant setups and handle request commands on multiple CPEs 120, 130 and 140. In this disclosure, the server 110 can perform the methods of the present disclosure. By using a forecast ranking engine, the forecasted time forecast ranking mechanism is applied by the server 110 to forecast the required processing time for each request command and to automatically adjust subsequent forecasted processing time according to the real processing time so as to adjust the processing order of requests from each CPE dynamically using the forecast ranking method. Aforementioned operations will be discussed further in the following paragraphs.

Figure 2:
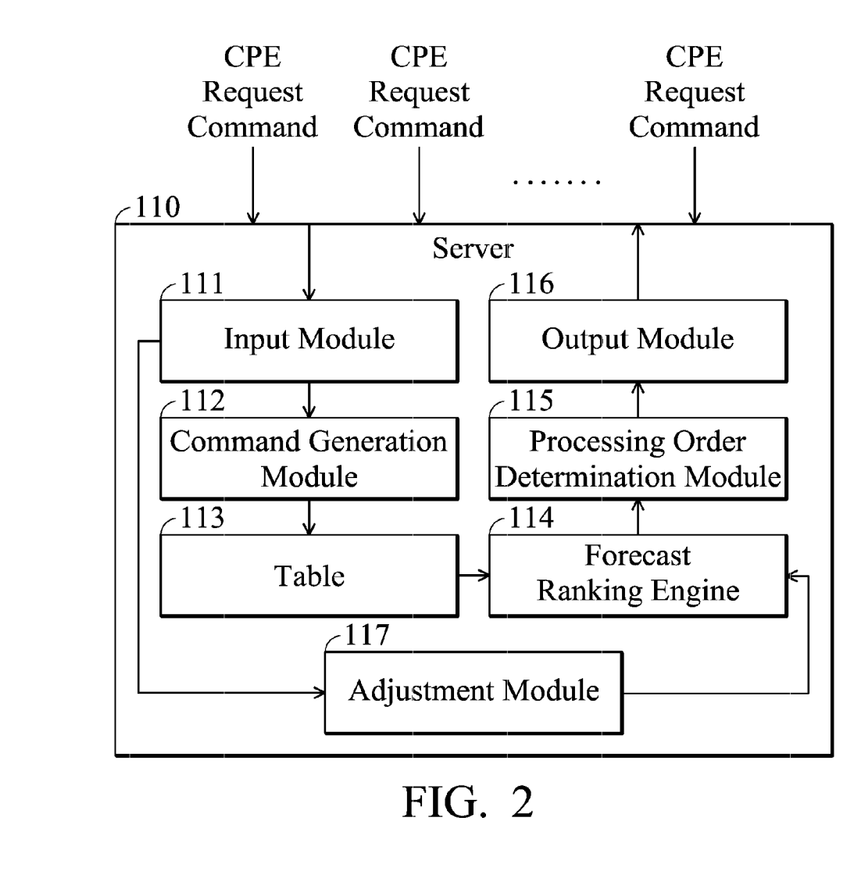
FIG. 2 is a block diagram illustrating an exemplary embodiment of a server of the disclosure.

FIG. 2 is a block diagram illustrating an exemplary embodiment of a server of the disclosure. As shown in FIG. 2, the server 110 may further comprise an input module 111, a command generation module 112, a table 113, a Forecast Ranking Engine (referred to hereinafter as FRE) 114, a processing order determination module 115, and an output module 116. The input module 111 is used for receiving larger number of request commands from the respective CPE (120,130,140). The command generation module 112 can automatically generate a command configuration document based on request/request command received from the respective CPE by the input module 111. This command configuration document conforms to CWMP and contains the data model profile and the set command value of the CPE of CWMP. The table 113, also known as the Forecast Processing Time Table (referred to as FPT table), is generated in the beginning, wherein the table 113 comprises a forecasted processing time for each responsive CWMP command of a plurality of predetermined data models which are CWMP-supported, for forecasting/estimating processing time of a specific CWMP command such that the server 110 can forecast/estimate and obtain a first processing time corresponding to the command configuration document by performing table lookup operation on the table 113, of which the first processing time indicates the forecasted processing time of commands within the command configuration document.

Figure 3A:
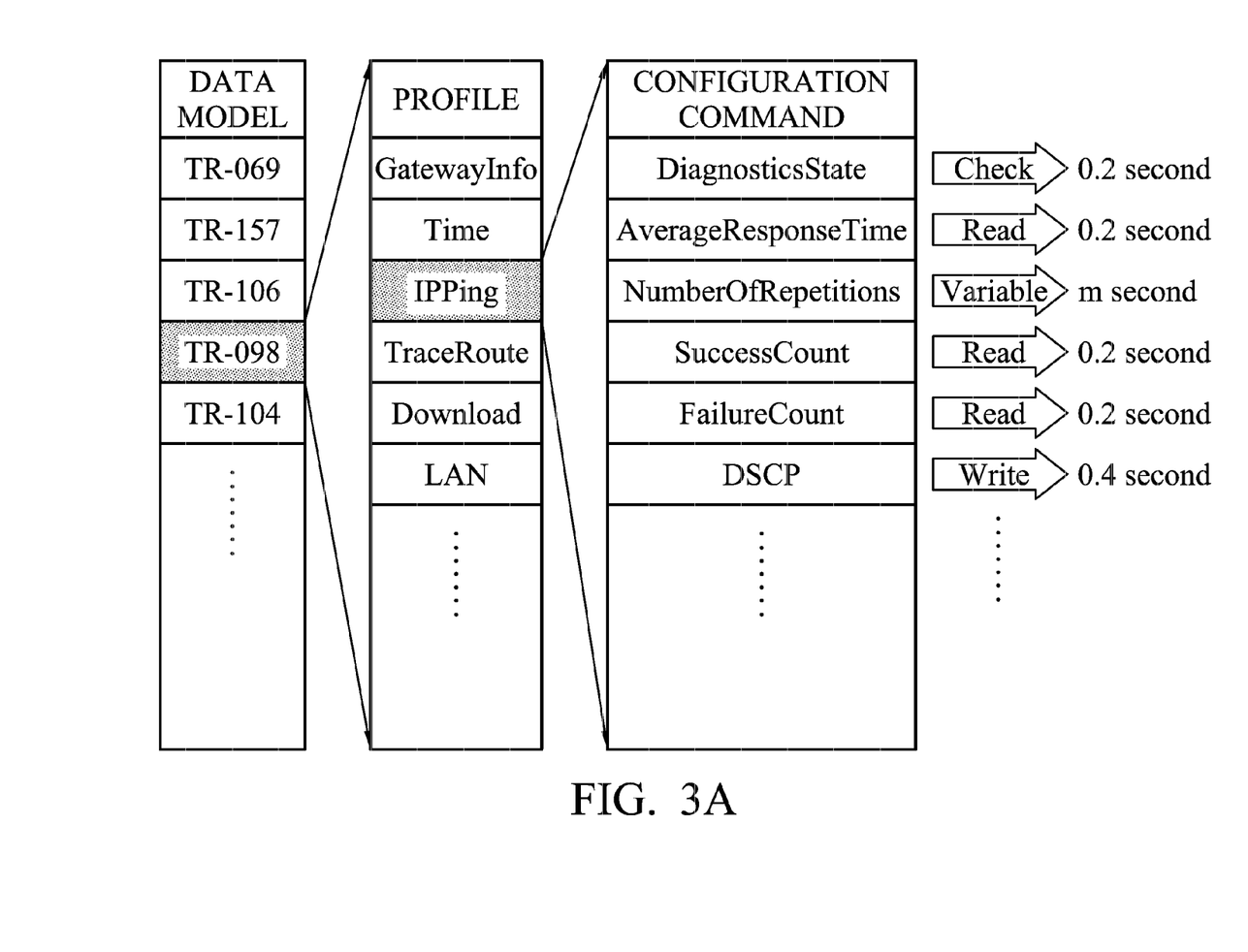
FIG. 3A is a schematic diagram illustrating an exemplary embodiment of table generation of the disclosure.
Figure 3B:
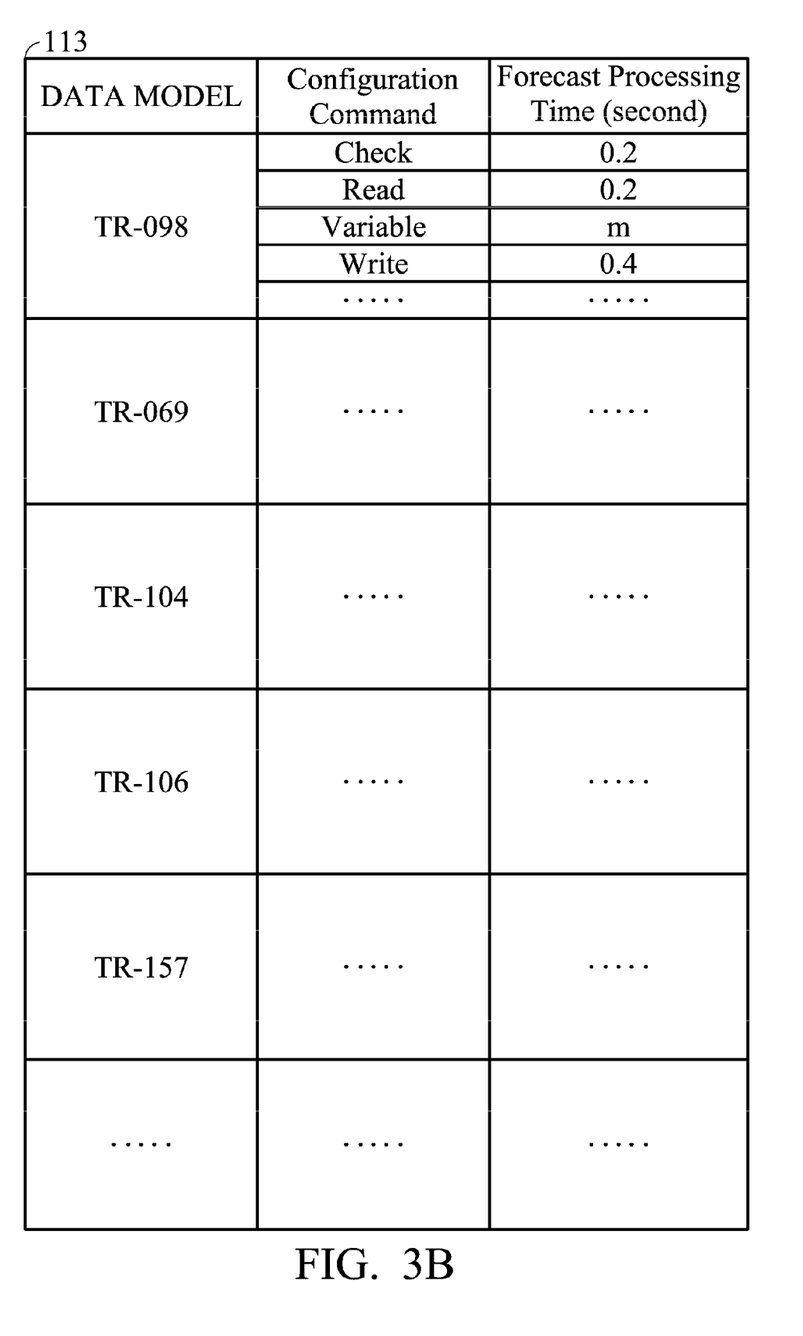
FIG. 3B is a schematic diagram illustrating an exemplary embodiment of a table of the disclosure.

FIG. 3A is a schematic diagram illustrating an exemplary embodiment of table generation of the disclosure. As shown in FIG. 3A, as the CWMP has already predetermined plural data models and each data model's possible corresponding command set, the server 110 can analyze and forecast in advance the processing time required by all possible configuration commands within the profile corresponding to the predetermined data models (for example, the data models TR-069, TR-157, TR-106, TR-098, TR-104, etc.) for each CPE WAN Management Protocol, and then in the time of its initial start operation, generate the table 113 comprising the forecasted processing time corresponding to all of the configuration commands within each of the predetermined data models supporting CWMP, as shown in FIG. 3B, for forecasting the processing time for each CWMP command by performing table lookup operation on the table 113 to obtain the aforementioned first processing time.

Figure 4:
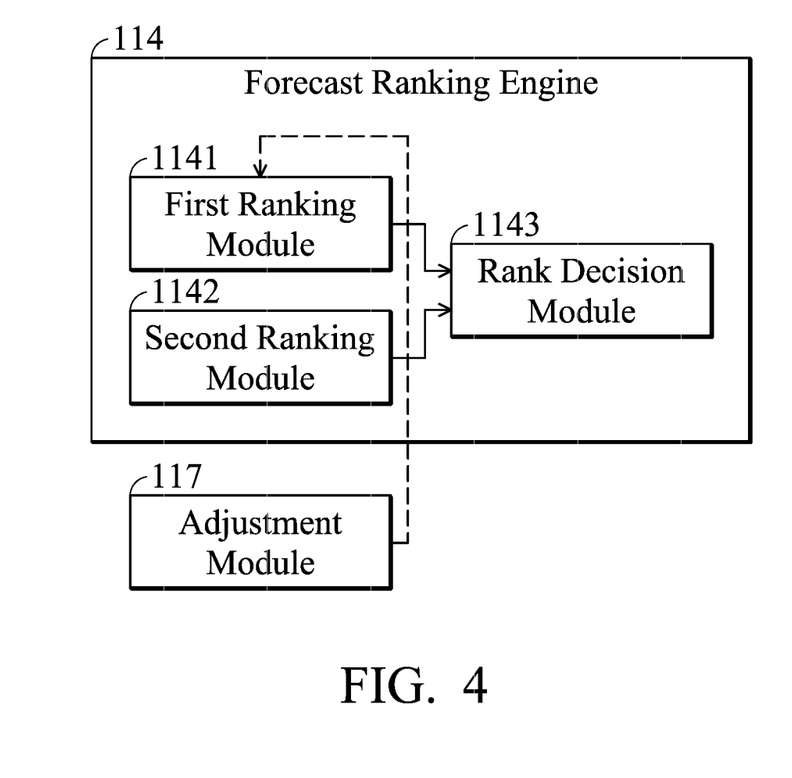
FIG. 4 is a schematic diagram illustrating an exemplary embodiment of a forecast ranking engine of the disclosure.

The FRE 114 may then forecast and obtain the first processing time indicating the forecasted processing time according to the command configuration document by performing table lookup operation on the table 113, and obtain a FRE ranking value according to the first processing time and the maximum waiting time. The ranking value of a request can be used for indicating the processing order of the request. FIG. 4 is a schematic diagram illustrating an exemplary embodiment of a FRE of the disclosure. As shown in FIG. 4, the FRE 114 may further comprise a first ranking module 1141, a second ranking module 1142 and a rank decision module 1143. The first ranking module 1141, also known as the FPT table ranking module, can obtain a forecasted processing time FPT from the table 113 and then further determine whether to modify the forecasted processing time in the table 113 according to a feedback and correctly real processing time. The FRE 114 may also provide each request a weight value Wi based on the importance of its processing time and then pass the value of the forecasted processing time and the weight value Wi to the rank decision module 1143 for further processing. The second ranking module 1142, also known as the maximum response time (referred to as MRT) lifetime ranking module, can obtain a maximum response time MRT from the request (e.g. the inform request) sent from each CPE, of which the maximum response time is served as the maximum waiting time, then provide each request a weight value Wj based on the importance of its maximum response time MRT and then pass the value of the maximum response time MRT and the weight value Wj to the rank decision module 1143 for further processing. The rank decision module 1143 can obtain a ranking value as a basis for dynamic adjustment of ranking, by performing a predetermined operation using the values FPT, Wi, MRT, and Wj provided by the first ranking module 1141 and the second ranking module 1142. For example, if it is assumed that Wi=50 and Wj=50, then the ranking value can be obtained according to the following expression: ranking value=Wi/FPT+Wj/MRT, but the disclosure is not limited thereto. After obtaining a ranking value calculated by the FRE 114, the processing order determination module 115 may dynamically adjust and arrange the processing order of pending or requesting CPE commands based on their ranking values. The output module 116 may then responses to the request of each CPE and process corresponding CPE configuration and setup jobs in order based on the processing order that was dynamically adjusted by the processing order determination module 115.

Figure 5:
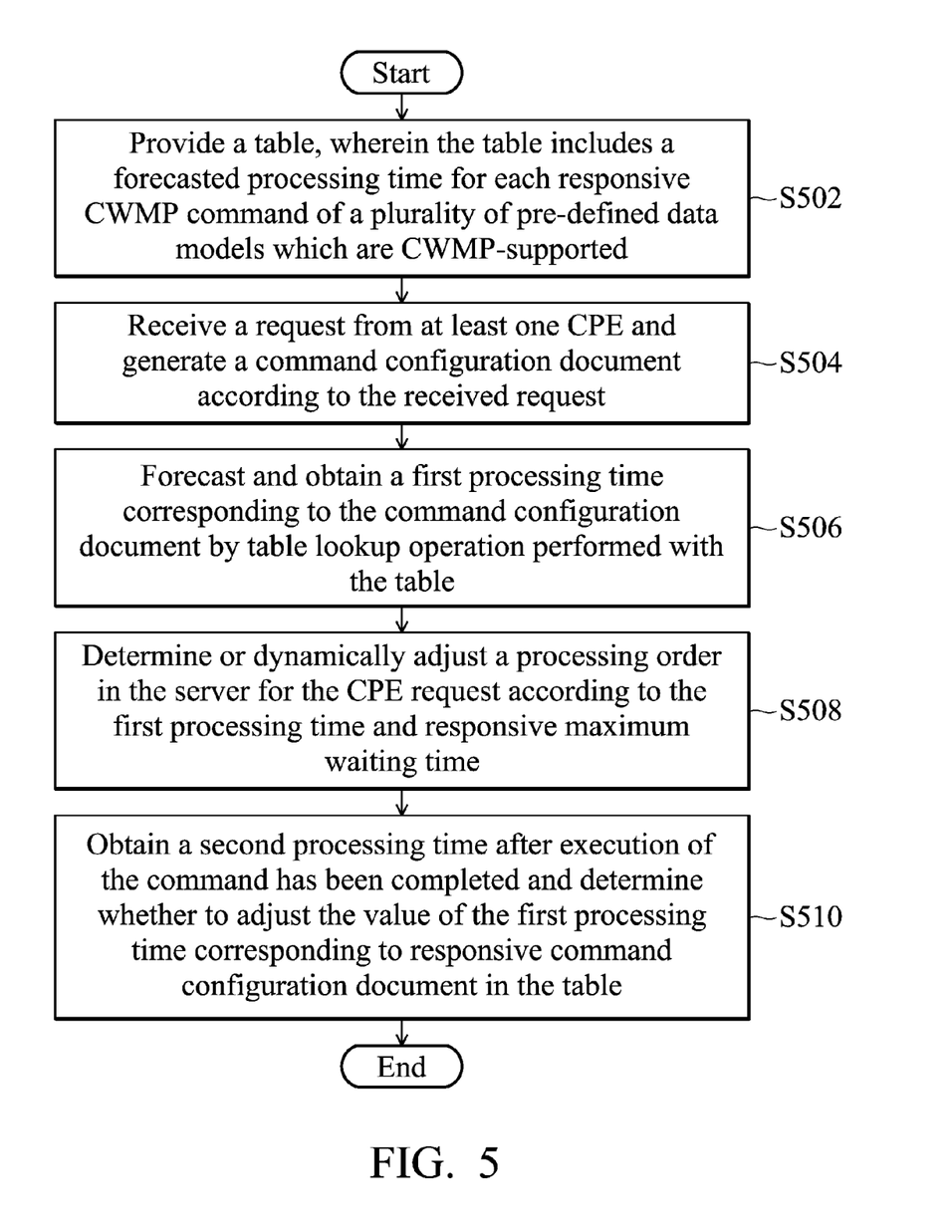
FIG. 5 is a flowchart of a method for improving performance of remote management according to an embodiment of the disclosure.

FIG. 5 is a flowchart of a method for improving performance of remote management according to an embodiment of the disclosure. The method for improving performance of remote management of the disclosure can be applied to the server 110 shown in the remote management system 100 of FIG. 1. In this embodiment, it is assumed that the server 110 can remotely manage at least one CPE 120, 130 and 140 via the network 150 (e.g. Wide area network) and the at least one CPE and the server 110 are both supporting CWMP. That is, each of the at least one CPE is an CPE compatible with the CPE defined in CWMP which is defined by the Broadband association while the server 110 is a server compatible with the ACS defined in CWMP which is defined by the Broadband association.

First, in step S502, the server 110 provides a table, wherein the table comprises a forecasted processing time for each responsive CWMP command of a plurality of predetermined data models which are CWMP-supported and the server 110 generates the table (e.g. the table 113) comprising the forecasted processing time corresponding to all of the configuration commands within each of the predetermined data models supporting CWMP in the time of its initial start operation.

Thereafter, in step S504, upon receiving a request from at least one CPE (e.g. the CPE 120), the server 110 generates a command configuration document according to the request.

After generating the command configuration document for the request, in step S506, the server 110 forecasts and obtains a first processing time corresponding to the command configuration document via the table. For example, the server 110 may analyze commands comprised in the command configuration document and looks up the table 113 to obtain the responsive forecasted processing times of the commands, and then forecasts/estimates the first processing time corresponding to the command configuration document by summing up all of the forecasted processing times or calculating the forecasted processing times by a predetermined rule. In other words, the first processing time indicates the required time for the server 110 to process all of the commands in the command configuration document.

After the first processing time has been obtained, in step S508, the server 110 utilizes the FRE 114 to determine or dynamically adjust a processing order in the server 110 for the CPE request. The maximum waiting time can be obtained from the maximum response time (MRT) in each request. For example, the server 110 may obtain a ranking value by performing a predetermined operation using the values FPT and responsive maximum waiting time MRT of each request, arrange the ranking values from large to small or from small to large to determine an optimal ranking position for processing the request command, so as to dynamically adjust and arrange the processing order of the request command. In some embodiments, the first ranking module 1141 may further provide a first weight value corresponding to the first processing time, the second ranking module 1142 may further provide a second weight value corresponding to the maximum waiting time, and the rank decision module 1143 can then perform a weighting operation on the first processing time and the maximum waiting time using the first weight value and the second weight value respectively to generate a ranking value. The rank decision module 1143 can obtain a ranking value as a basis for dynamic adjustment of ranking, by performing a predetermined operation using the values the first processing time FPT, the weight value Wi, the maximum response time MRT, and the weight value Wj provided by the first ranking module 1141 and the second ranking module 1142. For example, if it is assumed that Wi=50 and Wj=50, then the ranking value can be obtained according to the following expression: ranking value=Wi/FPT+Wj/MRT, but the disclosure is not limited thereto. After obtaining a ranking value calculated by the FRE 114, the processing order determination module 115 may dynamically adjust and arrange the processing order of pending or requesting CPE commands based on their ranking values.

After the processing or execution of commands corresponding to the CPE request has been actually completed, the server 110 may further obtain a second processing time and determine whether to the first processing time corresponding to the command configuration document to automatically adjust the forecasted processing time according to the second processing time so as to obtain more precisely ranking value. To be more specific, the adjustment module 117 of the server 110 can obtain a feedback second processing time after a connection is normally disconnected and a CPE close session message has received (i.e. after execution of commands of the CPE request has been completed), wherein the second processing time indicates a real processing time of the command. The feedback second processing time and the first processing time are then compared to be referenced by the FRE 114 or to directly modify the forecasted time value of the responsive command in the table 113 according to the comparison result to adjust the value of responsive forecasted processing time of this command, such that the forecasting can be more precisely. In some embodiments, the step that the server 110 determines whether to adjust the first processing time of the command configuration document according to the second processing time can be performed by comparing whether a difference between the first processing time and the second processing time has exceeded a predetermined threshold value. When the difference between the first processing time and the second processing time has exceeded the predetermined threshold value, the server 110 can utilize the second processing time to adjust the first processing time.

According to the forecast ranking engine (FRE) features of the disclosure, the server 110 can adjust the processing orders of various CPE request commands base on the ranking values generated by the forecast ranking engine 114, leading to earlier ending of the connection with a shorter processing time, thereby effectively reducing the time of the server 110 to be continuously occupied. The other connections in waiting will not easily exceed the maximum response time to cause the failed connection. Therefore, the total number of CPE connection requests that the server 110 can process in unit time can be effectively improved, and the overall waiting time of CPE can also be reduced.

In some embodiments, the value of the forecasted processing time within the table 113 can also be automatically adjusted after the real processing time has been obtained. In some embodiments, the first processing time may further be automatically adjusted after correct execution time has been obtained. Referring to FIG. 2, the server 110 may further comprise an adjustment module 117, which may obtain a second processing time indicating the real processing time for a request command after the execution of the request command has been completed and then determine whether to adjust the first processing time corresponding to the command configuration document according to the second processing time. In some embodiments, the step that the server 110 determines whether to adjust the first processing time of the command configuration document according to the second processing time can be performed by comparing whether a difference between the first processing time and the second processing time has exceeded a predetermined threshold value. When the difference between the first processing time and the second processing time has exceeded the predetermined threshold value, the server 110 utilizes the second processing time to adjust the first processing time. For example, if the first processing time indicating the forecasted processing time is 20 seconds, the second processing time indicating the real processing time is 30 seconds, and the threshold value is 5, the second processing time will be utilized to adjust the first processing time such as set the first processing time to the second processing time since the difference between the first processing time and the second processing time, which is 10, has exceeded the threshold value, so as to make subsequent forecasting more precisely.

Figure 6:
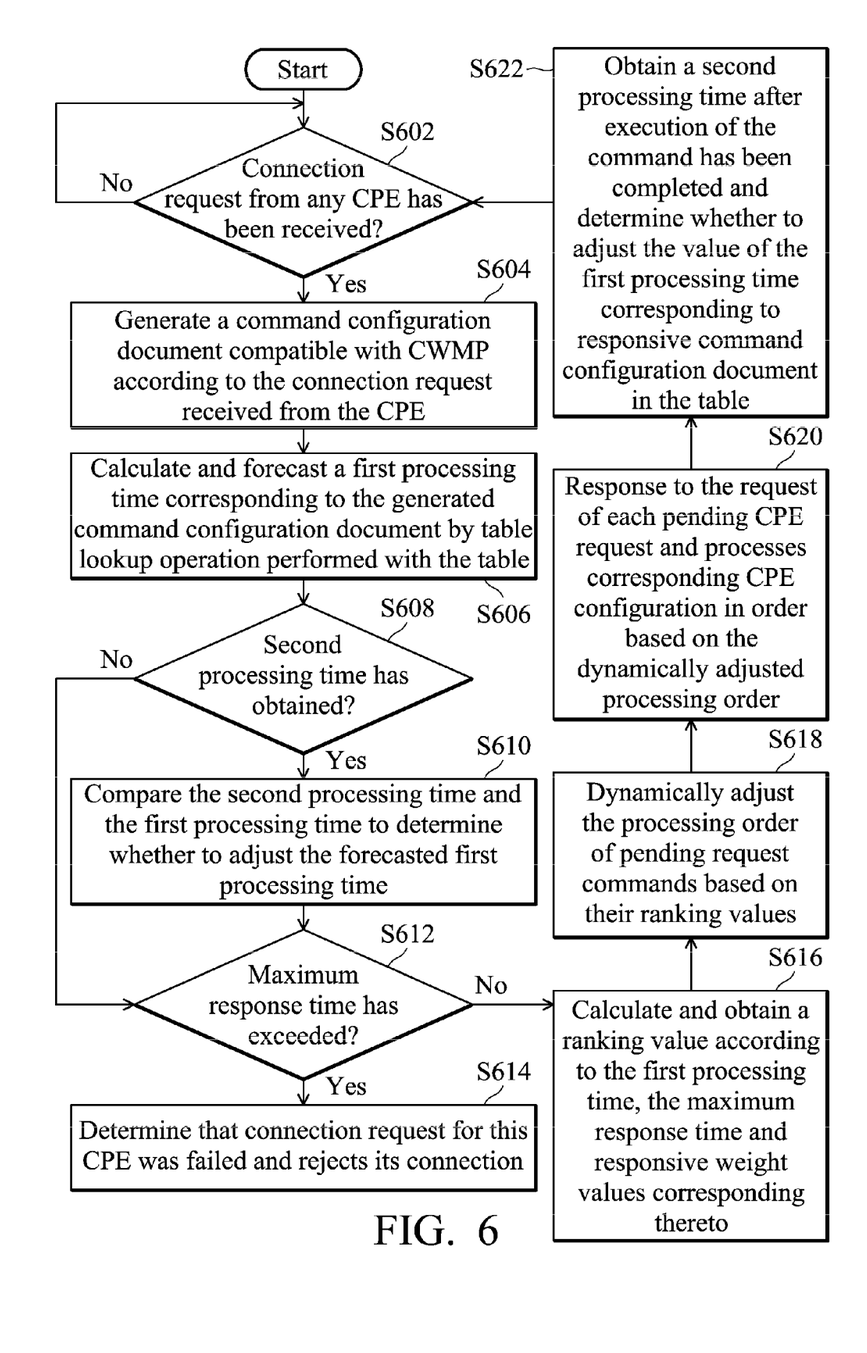
FIG. 6 is a flowchart of a method for improving performance of remote management according to another embodiment of the disclosure.

FIG. 6 is a flowchart of a method for improving performance of remote management according to another embodiment of the disclosure. The method for improving performance of remote management of the disclosure can be applied to the server 110 shown in the remote management system 100 of FIG. 1. In this embodiment, each of the at least one CPE is an CPE compatible with the CPE defined in CWMP which is defined by the Broadband association while the server 110 is a server compatible with the ACS defined in CWMP which is defined by the Broadband association. Moreover, the server 110 can remotely manage the CPEs 120, 130 and 140 via the network 150 (e.g. Wide area network). In this embodiment, it is assumed that the server 110 has a table 113 (as shown in FIG. 3B), wherein the table 113 which is obtained by the server 110 by forecasting the processing time required for each CPE command (e.g. CWMP profile command) in the time of its initial start operation, comprises a forecasted processing time for each responsive command of a plurality of predetermined data models which are CWMP-supported. In this embodiment, the maximum waiting time corresponding to each CPE is set to be the maximum response time (MRT).

First, in step S602, the server 110 determines whether a connection request from any CPE has been received. If not, the step S602 is repeatedly performed to wait for receiving the connection request. If a connection request from one of the CPEs has been received, in step S604, the server 110 generates a command configuration document compatible with CWMP, wherein the generated command configuration document at least comprises the type of the CWMP data module which is used and CPE profile command values for configuring the CPE.

Thereafter, in step S606, the server 110 calculates and forecasts a first processing time corresponding to the generated command configuration document by table lookup operation performed with the table 113, wherein the first processing time indicates a total forecasted time required for processing all of the configuration commands within the command configuration document.

After the first processing time corresponding to the command configuration document has been obtained, in step S608, the server 110 further determines whether a second processing time has obtained. As aforementioned, the adjustment module 117 of the server 110 may obtain a feedback second processing time after a connection is normally disconnected and a CPE close session message has received, wherein the second processing time indicates a real processing time of the command. When no such a second processing time, which is feedback by step S622, has been obtained, which means that no need for adjusting the forecasted first processing time, step S612 is further performed. When the second processing time of a request has been obtained (Yes in step S608), in step S610, the feedback second processing time and the first processing time are compared by the server 110 to determine whether to adjust the forecasted first processing time based on the second processing time which indicates the previously real processing time for the request. For example, the step that the server 110 determines whether to adjust the first processing time according to the second processing time can be performed by comparing whether a difference between the first processing time and the second processing time has exceeded a predetermined threshold value, and if so, the server 110 can utilize the second processing time to adjust the first processing time.

In step S612, the server 110 confirms whether the maximum response time (MRT) has been exceeded. If the MRT has not been exceeded, step S616 is further performed. Contrarily, if the maximum response time has been exceeded (Yes in step S612), in step S614, the server 110 determines that connection request for this CPE was failed and rejects its connection.

If the maximum response time has not been exceeded, in step S616, the server 110 further calculates and obtains a ranking value according to the FPT, MRT and responsive weight values corresponding thereto. In step S618, the server 110 may dynamically adjust and arrange the processing order of pending or requesting CPE commands based on their ranking values.

In step S620, the server 110 then responses to the request of each pending or requesting CPE and processes corresponding CPE configuration and setup jobs in order based on the processing order that has been dynamically adjusted.

After a connection is normally disconnected, in step S622, the server 110 receives a CPE close session message, and thus obtains the second processing time which indicates a real processing time therefrom. The server 110 may compare the feedback real processing time and the forecasted processing time and provide the comparison result to step S610 to determine whether to adjust forecasted processing time later.

For explanation, specific operations of methods for improving performance of remote management are illustrated as examples in the following embodiments, and those skilled in the art will understand that the present disclosure is not limited thereto.

Figure 7:
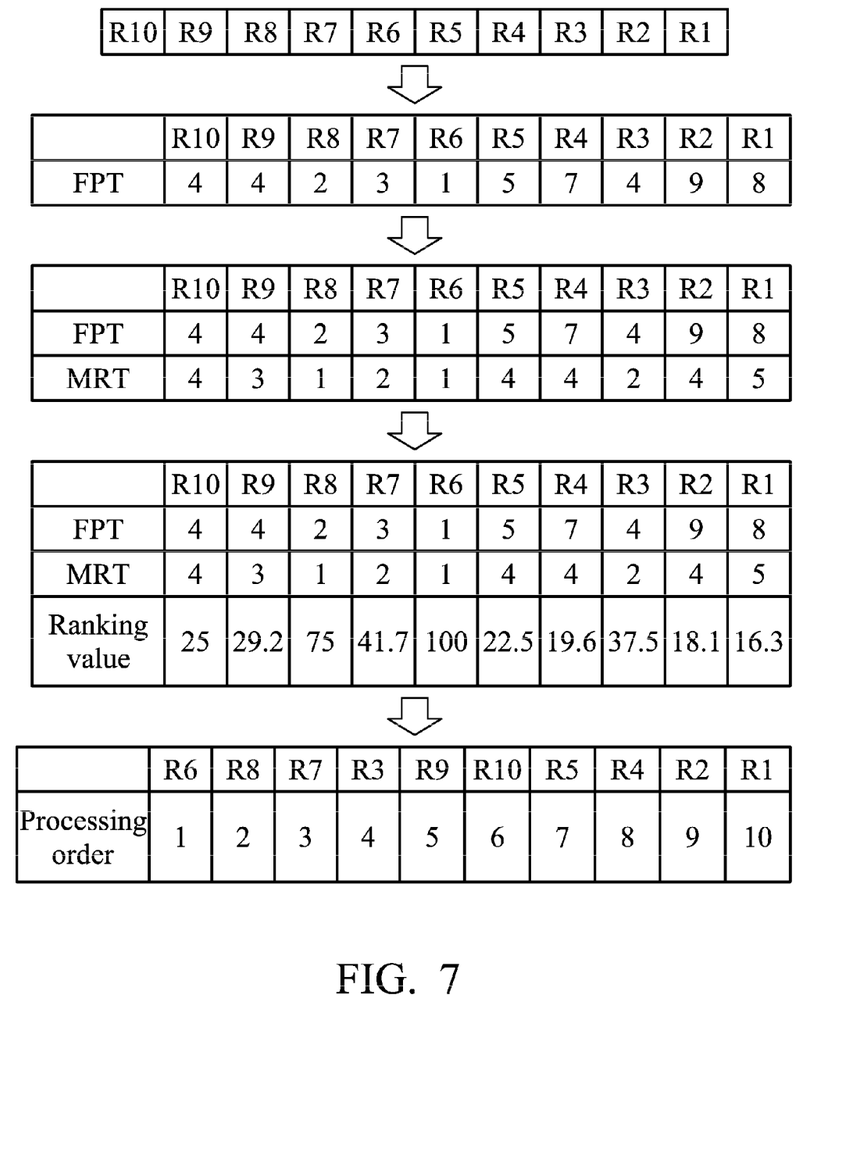
FIG. 7 is a schematic diagram illustrating an exemplary embodiment of forecast ranking mechanism of the disclosure.

FIG. 7 is a schematic diagram illustrating an exemplary embodiment of a dynamically forecast ranking mechanism of the disclosure. In this embodiment, assume that a total number of 10 CPE request commands R1-R10 wait for processing by the server 110. First, the server 110 looks up the table 113 to obtain the first processing time FPT indicating each CPE request command's corresponding forecasted processing time, and then obtains the maximum response time MRT of each CPE request command. Thereafter, via the FRE 114, appropriate weight values Wi and Wj were given to the first processing time FPT and the maximum response time MRT, and in accordance with an expression to obtain final ranking value (e.g.: ranking value=Wi/FPT+Wj/MRT), and then with this ranking value to dynamically adjust each CPE command processing order. For example, as shown in FIG. 7, the processing order of CPE request commands through R1-R10 in the server 110 will be R6→R8→R7→R3→R9→R10→R5→R4→R2→R1 in sequence. That is, R6 will be first processed, followed by R8, R7, and so on. It is observed from FIG. 7 that the forecasted-time-forecast-ranking mechanism of the disclosure can effectively improve the total number of connection requests of CPE that can be handled in the unit time of the server and reduce overall waiting time of the CPE. Subsequent new incoming CPE request may obtain its ranking value first in accordance with the method described above, and then based on its ranking value, dynamically determine which ranking to be arranged/inserted in the processing order of the server 110 for processing it.

In one embodiment, it is assumed that a total of 10 CPE request commands were to be processed. Further, the maximum response time of each CPE is set to be five seconds, and the maximum number of connections of the server 110 is set to be five. Then, five CPE request commands will be processed, and the other five CPE request commands must wait until the processing of the CPE being processed has been completed before they can enter for handling. In this case, five CPE request commands pending to be processed may wait too long and exceed the maximum wait time (i.e., the maximum response time), so the server 110 will determine the connection fails, resulting in limiting the processing capability of the server 110. With the remote management methods of the disclosure, however, after the first ranking module 1141 has adjusted the processing order, the processing order of the subsequently coming CPE request commands will be arranged from large to small, so they can make the waiting CPE request commands be fully processed within the maximum waiting time, thereby effectively increasing total CPE connection requests that the server 110 can process in unit time.

In another embodiment, assume that the maximum response time of each CPE is not the same and the maximum number of connections of the server 110 is fixed, by the remote management method of the disclosure, after the first ranking module 1141 has adjusted the processing order, the processing order of the subsequently coming CPE request commands will be arranged from large to small CPE request commands in processing. Then, after the arrangement of the second ranking module 1142, the one with smaller maximum response time (nearly approaching response time) is placed in front, so the CPE request command does not exceed the maximum response time restrictions.

In some embodiments, a remote performance management apparatus is further provided, which is configured between the server 110 and the CPEs 120, 130 and 140 for receiving request command from each CPE and applying the method of the disclosure to calculate the ranking value for each CPE request command so as to dynamically adjust or determine the processing order in the server 110 for each CPE command.

Figure 8:
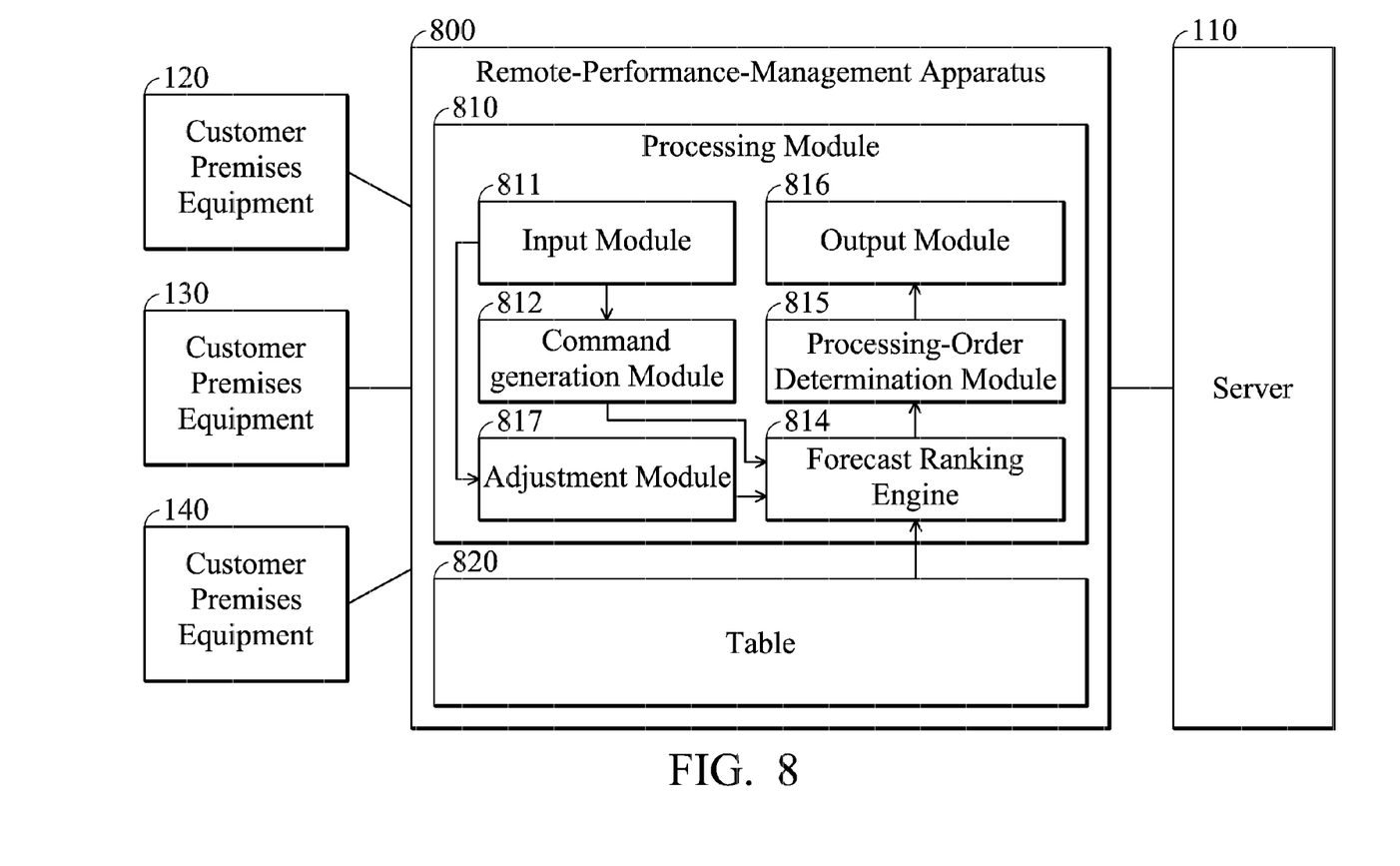
FIG. 8 is a schematic diagram illustrating an exemplary embodiment of a remote performance management apparatus of the disclosure.

FIG. 8 is a schematic diagram illustrating an exemplary embodiment of a remote performance-management apparatus of the disclosure. As shown in FIG. 8, the remote-performance-management apparatus 800 is configured between the server 110 and the CPEs 120, 130 and 140 for receiving request command from each CPE (e.g. the CPE 120, 130 or 140) and applying the aforementioned method of the disclosure to calculate ranking values for request command(s) of each of the CPEs 120, 130 and 140, so as to dynamically adjust or determine the processing order in the server 110 for each CPE command based on these ranking values. The remote-performance-management-apparatus 800 at least comprises a processing module 810 and a table 820, wherein the table 820 comprises a forecasted processing time for each responsive CWMP command of a plurality of predetermined data models which are CWMP-supported. Note that the generation and the content of the table 820 are similar to those of the table 113. Upon receiving a request command from any CPE, the processing module 810 may generate a command configuration document according to the request, forecast and obtain a first processing time corresponding to the command configuration document via the table, generate a ranking value according to the first processing time and a maximum waiting time, and then transmit all ranking values generated to the server 110, such that the server 110 can determine or dynamically adjust a processing order in the server 110 for this CPE request. The processing module 810 may further comprise an input module 811, a command generation module 812, a Forecast Ranking Engine (FRE) 814, a processing order determination module 815, and an output module 816. The input module 811 is used for receiving a first command from a CPE. The command generation module 812 can automatically generate a first command configuration document based on the first command. The FRE 814 is used for forecasting a first processing time by looking up the table 820 using the first command configuration document and the maximum waiting time. The output module 816 is used for outputting the ranking values generated by the FRE 814. The processing module 810 may further comprise an adjustment module 817 for obtaining a second processing time for the first command after the execution of the first command has been completed and then determining whether to adjust the first processing time corresponding to the first command configuration document according to the first processing time and the second processing time. It should be noted that, the architectures and related operations of the input module 811, the command generation module 812, the table 820, the forecast ranking engine 814, the processing order determination module 815, and the output module 816 are similar to those of responsive input module 111, the command generation module 112, the table 113, the forecast ranking engine 114, the processing order determination module 115 and the output module 816 as shown in FIG. 1, and thus detailed are omitted here for brevity.

Therefore, according to the remote management systems and apparatuses for supporting CWMP and related methods for improving performance of remote management of the disclosure, through the forecasted-time-forecast-ranking mechanism, the forecasted processing times and the maximum waiting times of the CPE request commands can be used as a basis for adjustment of the processing order of CPE requests, which can effectively increase the total number of CPE connection requests that the server can process in unit time and reduce the overall waiting time of the CPEs. Furthermore, the remote management systems and apparatuses for supporting CWMP and related methods for improving performance of remote management of the disclosure can further use relevant actual processing time as feedback to automatically adjust the forecasted processing time of each command, thereby making up the more accurate estimation of the time. As a result, the management capacity of CWMP can be further enhanced, thus improving the efficiency of remote management and lowering the overall costs of remote management.

While the disclosure has been described by way of example and in terms of exemplary embodiment, it is to be understood that the disclosure is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A remote management system for supporting Customer premises equipment WAN Management Protocol (CWMP), comprising:
   at least one customer premises equipment (CPE), transmitting a request; and
   a server coupled to the CPE via a network, for performing a management on the CPE;
   wherein the server further comprises a table comprising a forecasted processing time for each responsive CWMP command of a plurality of predetermined data models which are CWMP-supported, a forecast ranking engine and a processing order determination module and upon receiving the request, the server generates a command configuration document according to the request, the forecast ranking engine forecasts and obtains a first processing time according to the command configuration document by a table lookup operation performed with the table and obtains a ranking value according to the forecasted first processing time and a maximum waiting time (MWT) corresponding to the request, and the processing order determination module dynamically adjusts and arranges a processing order for processing the request in the server according to the ranking value generated by the forecast ranking engine;
   wherein the server processes requests from the at least one CPE according to the processing order,
   wherein the server further obtains a second processing time after execution of commands of the request has been completed and the server further determines whether to adjust the first processing time corresponding to the command configuration document according to the second processing time, wherein the server further determines whether to adjust the first processing time corresponding to the command configuration document according to the second processing time by comparing whether a difference between the first processing time and the second processing time has exceeded a predetermined threshold value, and when the difference between the first processing time and the second processing time has exceeded the predetermined threshold value, the server utilizes the second processing time to adjust the first processing time.

2. The remote management system as claimed in claim 1, wherein the server further comprises:
   an input module, receiving the request; and
   a command generation module, generating the command configuration document according to the request.

3. The remote management system as claimed in claim 1, wherein the server further comprises an adjustment module for obtaining the second processing time and determining whether to adjust the first processing time.

4. The remote management system as claimed in claim 2, wherein the forecast ranking engine further comprises:
   a first ranking module, forecasting the first processing time of the request by performing table lookup operation with the table;
   a second ranking module, determining the maximum waiting time from the command configuration document corresponding to the request; and
   a rank decision module, determining a ranking value corresponding to the request according to the first processing time and the maximum waiting time.

5. The remote management system as claimed in claim 4, wherein the first ranking module further provides a first weight value corresponding to the first processing time and the second ranking module further provides a second weight value corresponding to the maximum waiting time, and wherein the rank decision module further performs a weighting operation on the first processing time and the maximum waiting time using the first and second weight values respectively to generate the ranking value.

6. A method for improving performance of remote management for use in a server, wherein the server remotely manages at least one customer premises equipment (CPE) and the server and the CPE are both supporting Customer premises equipment WAN Management Protocol (CWMP), comprising:
   providing a table, wherein the table comprises a forecasted processing time for each responsive CWMP command of a plurality of predetermined data models which are CWMP-supported;

receiving a request from the at least one CPE and generating a command configuration document according to the request;

forecasting and obtaining, by a forecast ranking engine of the server, a first processing time according to the command configuration document by a table lookup operation performed with the table and obtaining a ranking value according to the forecasted first processing time and a maximum waiting time (MWT) corresponding to the request to determine a processing order in the server for the request;

dynamically adjusting and arranging, by a processing order determination module of the server, the processing order for processing the request in the server according to the ranking value generated by the forecast ranking engine to perform a management on the CPE; and processing, by the server, the request from the at least one CPE according to the processing order, wherein the method further comprises:

obtaining a second processing time after execution of commands of the request has been completed and determining whether to adjust the first processing time corresponding to the command configuration document according to the second processing time, wherein the step of determining whether to adjust the first processing time corresponding to the command configuration document according to the second processing time further comprises:

comparing whether a difference between the first processing time and the second processing time has exceeded a predetermined threshold value; and utilizing the second processing time to adjust the first processing time when the difference between the first processing time and the second processing time has exceeded the predetermined threshold value.

7. The method as claimed in claim 6, wherein the step of obtaining the ranking value according to the forecasted first processing time and the maximum waiting time to determine the processing order in the server for the request further comprises:

providing a first weight value corresponding to the first processing time and a second weight value corresponding to the maximum waiting time;

performing a weighting operation on the first processing time and the maximum waiting time using the first and second weight values respectively to generate the ranking value; and determining the processing order in the server for the request according to the ranking value.

8. A remote-performance-management apparatus configured between a server and at least one customer premises equipment (CPE), wherein the server and the CPE are both supporting Customer premises equipment WAN Management Protocol (CWMP), comprising:

a table, wherein the table comprises a forecasted processing time for each responsive CWMP command of a plurality of predetermined data models which are CWMP-supported; and a processing module, upon receiving a request from the at least one CPE, generating, by a forecast ranking engine of the processing module, a command configuration document according to the request, forecasting and obtaining a first processing time according to the command configuration document by a table lookup operation performed with the table, generating, by the forecast ranking engine, a ranking value according to the forecasted first processing time and a maximum waiting time (MWT) corresponding to the request, and transmitting, by an output module of the processing module, the ranking value to the server, such that the server performs a management on the CPE according to the ranking value, wherein the management comprises dynamically adjusts a processing order in the server for the request according to the ranking value, wherein the processing module further comprises an adjustment module for obtaining a second processing time after execution of commands of the request has been completed and determining whether to adjust the first processing time corresponding to the command configuration document in the table according to the first processing time and the second processing time by comparing whether a difference between the first processing time and the second processing time has exceeded a predetermined threshold value, and when the difference between the first processing time and the second processing time has exceeded the predetermined threshold value, utilizing the second processing time to adjust the first processing time.

9. The remote-performance-management apparatus as claimed in claim 8, wherein the processing module further comprises:

an input module, receiving the request; and a command generation module, generating the command configuration document according to the request.

\* \* \* \* \*